United States Patent [15] 3,694,813

Loh et al. [45] Sept. 26, 1972

[54] METHOD OF ACHIEVING DATA COMPACTION UTILIZING VARIABLE-LENGTH DEPENDENT CODING TECHNIQUES

[72] Inventors: Louis S. Loh, Mohegan Lake; Jacques H. Mommens, Briarcliff Manor; Josef Raviv, Ossining, all of N.Y.

[73] Assignee: International Business Machines Corporation, Armonk, N.Y.

[22] Filed: Oct. 30, 1970

[21] Appl. No.: 85,575

[52] U.S. Cl. ....................................340/172.5, 444/1

[51] Int. Cl. ............................G11b 13/00, G06f 7/00

[58] Field of Search ....................340/172.5; 235/157

[56] References Cited

UNITED STATES PATENTS

| | | | |
|---|---|---|---|
| 3,394,352 | 7/1968 | Wernikoff et al. | 340/172.5 |
| 3,422,403 | 1/1969 | Webb | 340/172.5 |
| 3,501,750 | 3/1960 | Webb | 340/172.5 |
| 3,432,811 | 3/1969 | Rinaldi | 340/172.5 |
| 3,535,696 | 10/1970 | Webb | 340/172.5 |
| 3,380,030 | 4/1968 | McMahon | 340/172.5 |

*Primary Examiner*—Paul J. Henon
*Assistant Examiner*—Mark Edward Nusbaum
*Attorney*—Hanifin and Jancin

[57] ABSTRACT

The present invention relates to a method practiceable on a general purpose electronic computer for statistically analyzing a data set and for producing a set of encoding and decoding (E/D) tables for achieving compaction of the original data set utilizing a variable length code. The method disclosed may operate under constraints of available core, desired compaction rate and speed of compaction/decompaction to produce differing sets of encoding/decoding tables depending upon the constraints imposed. The method would most normally be provided and utilized as a software package wherein the primary inputs are the data set itself and the above enumerated constraints. By utilizing a variable-length code wherein the code assignment is dependent upon the characteristic of preceding data good compaction rates may be achieved utilizing reasonable amounts of memory for the E/D tables.

The method comprises three principle steps. The first is the construction of a matrix showing the probability of occurrence of every member of the data set with respect to the immediately preceding member. The second step comprises grouping various rows or columns of this matrix having similar probabilities of occurrence, the third step comprises a reordering of all of the previously grouped rows or columns and finally a second clustering into coding sets may be performed.

15 Claims, 18 Drawing Figures

INVENTORS
LOUIS S. LOH
JACQUES H. MOMMENS
JOSEF RAVIV

BY [signature]
ATTORNEY

FIG. 4

FREQUENCY OF CO-OCCURRENCE MATRIX

| CHARACTERS \ STATES | 1 | 2 | 3 | 4 | 5 | 6 | 7 | 8 | 9 | 10 | 11 |
|---|---|---|---|---|---|---|---|---|---|---|---|
| A | 0 | 7 | 15 | 22 | 5 | 8 | 20 | 10 | 5 | 5 | 7 |
| B | 4 | 13 | 17 | 26 | 1 | 4 | 30 | 0 | 1 | 15 | 3 |
| C | 4 | 24 | 11 | 3 | 48 | 34 | 3 | 8 | 0 | 2 | 0 |
| D | 10 | 5 | 5 | 22 | 30 | 52 | 3 | 6 | 20 | 8 | 10 |
| E | 0 | 8 | 4 | 16 | 2 | 8 | 55 | 64 | 15 | 0 | 2 |
| F | 6 | 20 | 33 | 3 | 38 | 8 | 50 | 40 | 1 | 3 | 3 |
| G | 1 | 10 | 0 | 30 | 21 | 39 | 19 | 9 | 18 | 9 | 20 |
| H | 0 | 5 | 1 | 13 | 7 | 15 | 16 | 5 | 20 | 32 | 15 |
| I | 0 | 5 | 15 | 2 | 8 | 0 | 3 | 10 | 14 | 0 | 20 |
| J | 0 | 7 | 3 | 0 | 10 | 2 | 3 | 20 | 33 | 2 | 15 |

FIG. 5A

DISTANCE BETWEEN STATES MATRIX

| STATES | 1 | 2 | 3 | 4 | 5 | 6 | 7 | 8 | 9 | 10 | 11 |
|---|---|---|---|---|---|---|---|---|---|---|---|
| 1 | - | | | | | | | | | | |
| 2 | 21 | - | | | | | | | | | |
| 3 | 23 | 23 | - | | | | | | | | |
| 4 | 36 | 55 | 89 | - | | | | | | | |
| 5 | 20 | 24 | 60 | 117 | - | | | | | | |
| 6 | 22 | 56 | 114 | 55 | 43 | - | | | | | |
| 7 | 44 | 50 | 60 | 65 | 134 | 157 | - | | | | |
| 8 | 43 | 44 | 65 | 108 | 101 | 132 | 55 | - | | | |
| 9 | 53 | 77 | 115 | 76 | 106 | 90 | 126 | 80 | - | | |
| 10 | 31 | 51 | 83 | 36 | 91 | 60 | 80 | 114 | 61 | - | |
| 11 | 47 | 54 | 84 | 57 | 76 | 74 | 108 | 77 | (15) | 42 | - |

FIG. 5B

| STATE "1" | | |
|---|---|---|
| NUMBER OF OCCURRENCES | NUMBER OF BITS PER CHARACTER | TOTAL BITS FOR ALL CHARACTERS |
| 0 | 0 | 0 |
| 4 | 4 | 16 |
| 4 | 3 | 12 |
| 10 | 1 | 10 |
| 0 | 0 | 0 |
| 6 | 2 | 12 |
| 1 | 4 | 4 |
| 0 | 0 | 0 |
| 0 | 0 | 0 |
| 0 | 0 | 0 |

TOTAL BITS 54

FIG. 5C

| STATE "2" | | |
|---|---|---|
| NUMBER OF OCCURRENCES | NUMBER OF BITS PER CHARACTER | TOTAL BITS FOR ALL CHARACTERS |
| 7 | 4 | 28 |
| 13 | 3 | 39 |
| 24 | 2 | 48 |
| 5 | 4 | 20 |
| 8 | 4 | 32 |
| 20 | 2 | 40 |
| 10 | 4 | 40 |
| 5 | 5 | 25 |
| 5 | 5 | 25 |
| 7 | 4 | 28 |

TOTAL BITS 325

FIG. 5D

| STATES "1" & "2" COMBINED | | |
|---|---|---|
| NUMBER OF OCCURRENCES | NUMBER OF BITS PER CHARACTER | TOTAL BITS FOR ALL CHARACTERS |
| 7 | 5 | 35 |
| 17 | 3 | 51 |
| 28 | 2 | 56 |
| 15 | 3 | 45 |
| 8 | 4 | 32 |
| 26 | 2 | 52 |
| 11 | 4 | 44 |
| 5 | 5 | 25 |
| 5 | 5 | 25 |
| 7 | 5 | 35 |

TOTAL BITS 400
-379
21

FIG. 5E 57 92 126 92 126 115 176 112 –

66

FIG. 6A

CLUSTERING OF STATES MATRIX

| CHARACTERS ↓ / GROUPS → | (1) | (2) | (3) | (4) | (5) |
|---|---|---|---|---|---|
| A | 27 | 27 | 8 | 30 | 12 |
| B | 35 | 41 | 4 | 30 | 4 |
| C | 87 | 5 | 34 | 11 | 0 |
| D | 50 | 30 | 52 | 9 | 30 |
| E | 14 | 16 | 8 | 119 | 17 |
| F | 97 | 6 | 8 | 90 | 4 |
| G | 32 | 39 | 39 | 28 | 38 |
| H | 13 | 45 | 15 | 21 | 35 |
| I | 28 | 2 | 0 | 13 | 34 |
| J | 20 | 2 | 2 | 23 | 48 |

FIG. 7

REORDERED GROUP MATRIX

| CHARACTERS ↓ / GROUPS → | (1) | (2) | (3) | (4) | (5) |
|---|---|---|---|---|---|
| a | 13 | 2 | 0 | 9 | 0 |
| b | 14 | 2 | 2 | 11 | 4 |
| c | 20 | 5 | 4 | 13 | 4 |
| d | 27 | 6 | 8 | 21 | 12 |
| e | 28 | 16 | 8 | 23 | 17 |
| f | 32 | 27 | 8 | 28 | 30 |
| g | 35 | 30 | 15 | 30 | 34 |
| h | 50 | 39 | 34 | 30 | 35 |
| i | 87 | 41 | 39 | 90 | 38 |
| j | 97 | 45 | 52 | 119 | 48 |

FIG. 6B

GROUP MEMBERSHIP TABLE

| CHARACTERS (DEP) | O | A | B | C | D | E | F | G | H | I | J |
|---|---|---|---|---|---|---|---|---|---|---|---|
| STATES | 1 | 2 | 3 | 4 | 5 | 6 | 7 | 8 | 9 | 10 | 11 |
| GROUPS | 1 | 1 | 1 | 2 | 1 | 3 | 4 | 4 | 5 | 2 | 5 |

FIG. 8

MAPPING TABLE FOR ENCODING

| | 1 | 2 | 3 | 4 | 5 |
|---|---|---|---|---|---|
| A | d | f | d | g | d |
| B | g | i | c | h | b |
| C | i | c | h | b | a |
| D | h | g | j | a | f |
| E | b | e | e | j | e |
| F | j | d | f | i | c |
| G | f | h | i | f | i |
| H | a | j | g | d | h |
| I | e | a | a | c | g |
| J | c | b | b | e | j |

FIG. 9

MAPPING TABLE FOR DECODING

| | 1 | 2 | 3 | 4 | 5 |
|---|---|---|---|---|---|
| a | H | I | I | D | C |
| b | E | J | J | C | B |
| c | J | C | B | I | F |
| d | A | F | A | H | A |
| e | I | E | E | J | E |
| f | G | A | F | G | D |
| g | B | D | H | A | I |
| h | D | G | C | B | H |
| i | C | B | G | F | G |
| j | F | H | D | E | J |

FIG. 10

| GROUPS | (1) | (2) | (3) | (4) | (5) |
|---|---|---|---|---|---|
| (1) | - | | | | |
| (2) | 24 | - | | | |
| (3) | 16 | 13 | - | | |
| (4) | 0 | 15 | 10 | - | |
| (5) | 26 | 4 | 11 | 17 | - |

DISTANCE MATRIX FOR REORDERED GROUPS

CODING SET AND ASSIGNMENT TABLE

| CODING SET 1 | FREQ. OF OCCURRENCE | COMPACT CODE WORD | CODING SET 2 | FREQ OF OCCURRENCE | COMPACT CODE WORD |
|---|---|---|---|---|---|
| a | 22 | 11111 | a | 2 | 1111111 |
| b | 25 | 11110 | b | 8 | 1111110 |
| c | 33 | 1110 | c | 13 | 111110 |
| d | 48 | 1101 | d | 26 | 11110 |
| e | 51 | 1100 | e | 41 | 1110 |
| f | 60 | 1011 | f | 65 | 110 |
| g | 65 | 1010 | g | 79 | 101 |
| h | 80 | 100 | h | 108 | 100 |
| i | 117 | 01 | i | 118 | 01 |
| j | 216 | 00 | j | 145 | 00 |

| GROUP | 1 | 2 | 3 | 4 | 5 |
|---|---|---|---|---|---|
| CODING SET | 1 | 2 | 2 | 1 | 2 |

CODING SET MEMBERSHIP TABLE

METHOD OF ACHIEVING DATA COMPACTION UTILIZING VARIABLE-LENGTH DEPENDENT CODING TECHNIQUES

CROSS-REFERENCE TO RELATED APPLICATIONS

This invention is related to an application entitled CODE PROCESSOR FOR VARIABLE-LENGTH DEPENDENT CODE having the same inventors as the present application and filed concurrently herewith which discloses a hardware embodiment utilizing the assignment and mapping tables of the present invention to produce Encoding/Decoding tables for effecting data compaction.

Application Ser. No. 119,275 entitled METHOD OF DECODING A VARIABLE-LENGTH PREFIX-FREE COMPACTION CODE, filed Feb. 26, 1971 of L.S. Loh, J.H. Mommens and J. Raviv discloses a method for decoding compacted data wherein the code assignments may be provided by the present invention.

BACKGROUND OF THE INVENTION

It is characteristic of information handling systems that the cost of the storage devices used to hold the files strains the user's budget. As the files grow--and they always do--more physical storage devices are needed until, eventually, the limit is reached. Regardless of whether the limit is set by hardware constraints, budget, floor space, or customer attitude, some alternative method of coping with the storage problem is required.

There are known procedures for reducing the size of files. In general, they sacrifice time to save space. The simplest of these procedures is to eliminate unnecessary records. This is an extreme case of file migration.

A second class of procedures involves blocking records within a file to minimize unused storage space.

A third method of reducing file size is data compaction. Two levels of compaction are most significant. The first is character and symbol suppression and the second is character and symbol encoding.

Character suppression is a form of run-length encoding in which a string of identical characters (or multi-character symbols and words) is replaced by an identifier and a count.

After migration and blocking have been applied to a file, it is possible to achieve additional compaction, in some cases quite a lot, by substituting more efficient codes for those commonly used. In the S/360 which has eight-bit bytes, it is possible to use 256 different characters. Most applications use fewer characters in their alphabet for the simple reason that the sources of input and the devices for output only handle 64 or fewer characters. Similarly, programming languages have limited character sets (COBOL: FORTRAN and PL/1:60, being examples).

An alphanumeric file may contain only 64 different character codes out of the 256 available. Also, when a file contains all the 256 possible characters in the eight-bit byte, they are not all used equally often, i.e., some are very frequent and others are very rare, (as mentioned before, some may not ever be used). Therefore, an efficient coding scheme can achieve data compaction. This would be accomplished by encoding the common symbols with short codes and the rare symbols with longer codes such that the average code length for the file is reduced. Table 1 shows such a coding scheme for an oversimplified alphabet of only four symbols (A, B, C, D).

TABLE 1

| Character | 2 Bit Binary Code | Variable Lgth. Code | Probability Of Occurrence in Data Set | Code Length |
|---|---|---|---|---|
| A | 00 | 0 | ½ | 1 |
| B | 01 | 10 | ¼ | 2 |
| C | 10 | 110 | ⅛ | 3 |
| D | 11 | 111 | ⅛ | 3 |

If A is known to occur twice as often as B and B occurs twice as often as C and D, a new code can take this into account.

Expected Length $= (\frac{1}{2} \times 1) + (\frac{1}{4} \times 2) + (\frac{1}{8} \times 3) + (\frac{1}{8} \times 3) = 1.75$ bits/character.

The code used in the above Table is a simple one known as the Huffman code and is only exemplary of such compaction codes. It has many desirable characteristics. The Huffman code has the minimum expected length (i.e., it is very efficient) and is constructed in a straightforward way. It is prefix-free; that is, the code for one character cannot be confused with the beginning of the code for another character. Decoding can be done by a single table look-up. However, storage requirements are very severe if the length of the longest code word is large. Every character in the original message can be reconstructed from the coded message. The code is content-independent in that it ignores what the files are about; it only depends on the frequency of occurrence of characters in the alphabet.

The size of the alphabet or character set is arbitrary in such a system. The method of deriving the Huffman code words for any list of symbols is based on the probability of their occurrence. The alphabet selected for an information storage and retrieval application might contain all 256 possible byte configurations plus common multi-character symbols such as "and," "the," "Jan-Dec," etc. The user has flexibility in establishing the list the symbols to be encoded. The Huffman code is not the only one possible. There are other efficient prefix-free codes.

In compaction codes such as the Huffman code, the coding of a particular character is based solely on the identity of the character.

SUMMARY & OBJECTS

It has been found that an improvement is achievable in data compaction methods by coding characters utilizing variable-length codes based not only on the frequency of occurrence of the particular character but also based upon the character which immediately precedes the character being coded. If this notion is applied straight forwardly, it would require a substantial amount of storage. Savings of storage space is achieved by grouping together various sets of characters having similar occurrence properties.

Accordingly, it is a primary object of the present invention to provide an improved method for achieving data compaction.

It is a further object of the invention to provide such a method utilizing variable-length compaction codes.

It is another object of the invention to provide such a data compaction method wherein the variable-length codes are prefix-free.

It is yet another object of the invention to provide such a data compaction method wherein the coding is done on a preceding character dependent basis.

It is still a further object of the invention to provide such a data compaction method wherein a character co-occurrence matrix is developed for a particular data base.

It is another object to provide such a method wherein dependence groups having similar statistical characteristics are joined together.

It is yet another object to provide such a method wherein further joining may be performed after reordering of the members of the groups. Then, further clustering is done into coding sets.

Other features, objects and advantages of the invention will be apparent from the following more particular description of the preferred embodiment of the invention as illustrated in the accompanying drawings.

DESCRIPTION OF DRAWINGS

FIG. 4 comprises a Frequency Co-occurrence Matrix illustrating one step utilized in practicing the present method.

FIG. 5A comprises a Distance Between States Matrix plotted for the Matrix of FIG. 4 illustrating another one of the steps of the present method.

FIGS. 5B, 5C and 5D comprise charts illustrating the computation of distances between the states shown in FIG. 4.

FIG. 5E illustrates the computation of a new line for the Distance Between States Matrix necessitated by the Clustering of two states.

FIG. 6A comprises a Clustering of States Matrix and represents the final reduction of the matrix shown in FIG. 4 after the clustering has proceeded to five groups.

FIG. 6B comprises a mapping table which shows to which group each of the original states of FIG. 4 belongs following the final clustering operation.

FIG. 7 comprises a Re-ordered Group Matrix illustrating the five groups shown in FIG. 6A in re-ordered form.

FIGS. 8 and 9 comprise Mapping Tables for Encoding and Decoding respectively which are constructed from the matrices shown in FIGS. 6A and 7.

FIG. 10 comprises a Distance Between Groups Matrix for Re-Ordered Groups of the matrix of FIG. 7.

DESCRIPTION OF THE DISCLOSED EMBODIMENT

Figure 1:
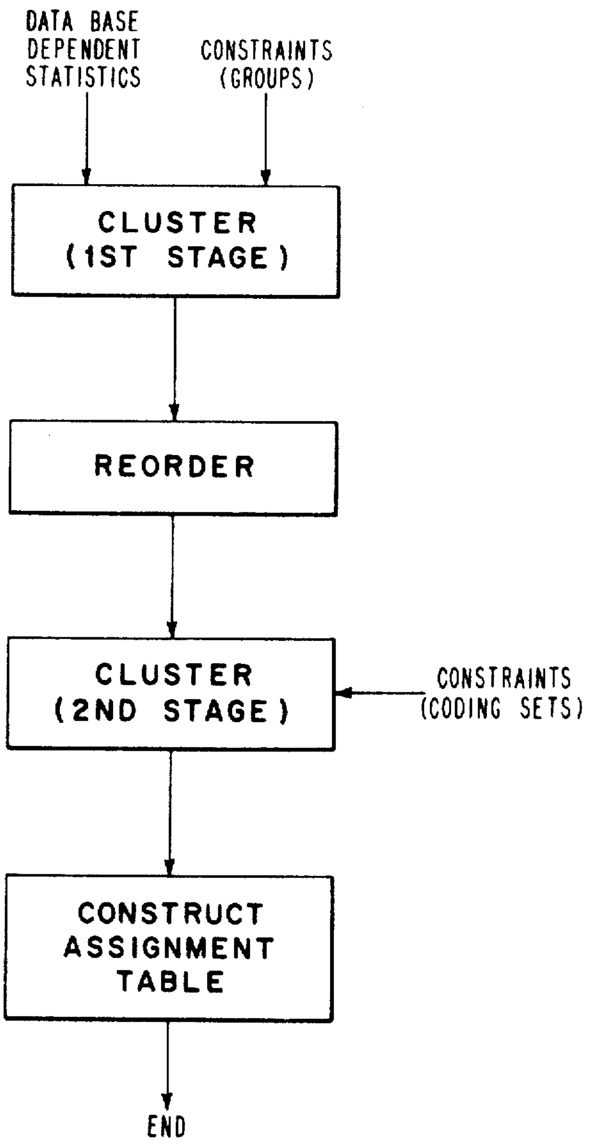
FIG. 1 comprises a high level flow chart of the present data compaction method.

The objects of the present invention are accomplished in general by a method for effecting the compaction of binary data utilizing a variable length compaction code which comprises the steps of forming a dependent frequency of occurrence matrix for the complete character set of a typical sample of a data base being analyzed and, clustering states within the frequency matrix together into a predetermined number of groups. Finally, each of the groups is utilized to make up an assignment table wherein each member of each group is assigned a specific variable length compaction code.

As a further step of the present data compaction method the members in each of the individual groups are re-ordered on a frequency of occurrence basis and a mapping table is made to keep track of the re-ordering. Subsequent to the re-ordering step, a further clustering operation may be performed to reduce the number of re-ordered groups into a number of final coding sets. A mapping table of this second clustering operation is also kept to indicate into which coding set a given group is finally clustered.

In order to optimally perform the clustering operations both from the original states of the co-occurrence matrix into the final groups and subsequently from the re-ordered groups into the coding sets, it is desirable to form a distance matrix to optimize these clustering operations. The distance matrix indicates which two members may be combined to result in a minimum loss of compaction.

According to the preferred embodiment of the invention a variable length prefix free compaction code such as the Huffman code is utilized and it is this code which is utilized in forming both the distance matrices and also in forming the final assignment tables. However, other variable length prefix free codes such as, for example, the Shannon-Fano and Gilbert-Moore codes, could be utilized with the teachings of the present invention to accomplish improved compaction ratios. The Huffman code is quite well known in the field of data compaction and for a more complete discussion of the way a code is assigned based on a frequency of occurrence basis to various characters of the data base, reference may be made to such volumes as 1. "Information Theory and Coding" by Norman Abramson, McGraw-Hill; or 2. "Information Theory and Reliable Communication" by Robert G. Gallager, John Wiley and Sons, Inc.

By utilizing the concepts of the present invention a method of achieving data compaction is provided through a much more efficient coding of the data.

The first underlying concept is that more efficient compaction is possible wherein the coding is done on a dependent basis. That is, the just preceding character is examined with the result that there is a higher probability of certain characters following a given character than other characters. As a very untypical example, consider the letter Q. If reference is made to a dictionary it will be noted that virtually every word beginning with the letter Q is followed by the letter U. It is also very uncommon for the letter Q to appear anywhere in a word other than as a first letter. Keeping these two facts in mind, it will be obvious that after the occurrence of the letter Q in a data string, there is a high probability that the next character will be U. Though U in general is not one of the most frequent characters. Thus, a very short code word length could be assigned to the letter U for that case where the preceding character is Q.

It may thus be seen that by utilizing a dependent analysis of a typical sample of a data base, a higher probability of prediction of the occurrence of a given character is possible. The result is that much shorter codes are possible which of course provides greater compaction of the encoded data. However, the difficulty of utilizing a completely dependent coding scheme is that an extremely large section of memory must be utilized for the table look up procedure to obtain the required codes for both encoding and decoding.

According to the teachings of the present invention it has been found that a significant saving in memory is possible with a minimal loss of compaction by grouping certain of the states together. What is meant by state will become apparent from the subsequent description, however, briefly a "state" refers to each dependent category for the complete character set based on a particular preceding character. In the subsequent description, if there are $n$ characters in the data set, there will be $n+1$ states, wherein the extra 1 is utilized to cover the situation where the immediately preceding character does not exist, i.e., the beginning of a record.

Proceeding further with this combination of states theory which is referred to as clustering in the present invention, the clustering is done preferentially after a complete analysis of all the states to determine which states lie closest together insofar as coding is concerned. What this means is that all of the states are analyzed with respect to each other, and it is determined how many additional code bits would be required, if any two states were combined, over that required if they were coded separately. The difference between these two figures is referred to as the distance of the two states in the present description.

According to the teachings of the present invention this last mentioned clustering operation will occur at two different points in the overall assignment table generation process. The first, as stated previously, is after a complete frequency of co-ocurrence of states matrix has been generated. If three states standing for the preceding characters *a*, *e* and *o*, had been combined for example, then each of the characters of this group would have a frequency of occurrence figure which would indicate how often it appears in the data base after an *a*, *e* or *o*.

It has further been found that a second stage of clustering performed subsequent to a re-ordering of the members of each group allows a further reduction in memory requirements without significant loss of compaction. When the members of the groups are re-ordered the group distances are usually quite small as will be apparent from the subsequently described example and a further clustering into a small number of Coding Sets is possible. Thus, together with the overhead of mapping tables a saving of storage space with a very small degradation in compaction rate is achievable.

Figures 11A, 11B, 12:
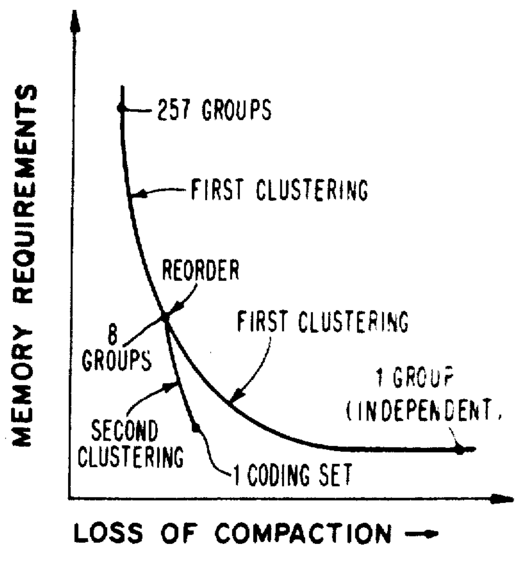
FIG. 11A comprises the Coding Set and Assignment Table which comprises the final output of the present method.
FIG. 11B comprises a Membership Table for determining to which Coding Set a particular group Belongs.
FIG. 12 comprises a graphical representation of memory requirements vs. compaction with different degrees of clustering.

Referring briefly to FIG. 12 which is a typical curve for data bases that were analyzed, the results of clustering into groups and subsequently into coding sets may readily be seen. In this Figure, Loss of Compaction is shown on the X axis and the Memory Requirements for mapping tables as well as coding/decoding tables is shown on the Y axis.

It will of course be apparent that the curve of FIG. 12 will be exemplary of only a particular character set in a particular data base, however, the general applicability of the curves would tend to hold true for most data bases. Note that by introducing the concept of clustering of the re-ordered groups prior to assigning codes the curve can be markedly changed so that better compaction is available with less memory space than would be possible if the original clustering procedure was continued.

Having thus outlined the general features of the present invention, the method of providing data compaction tables and codes anticipated will now be set forth in detail with reference to the drawings.

Figure 2:
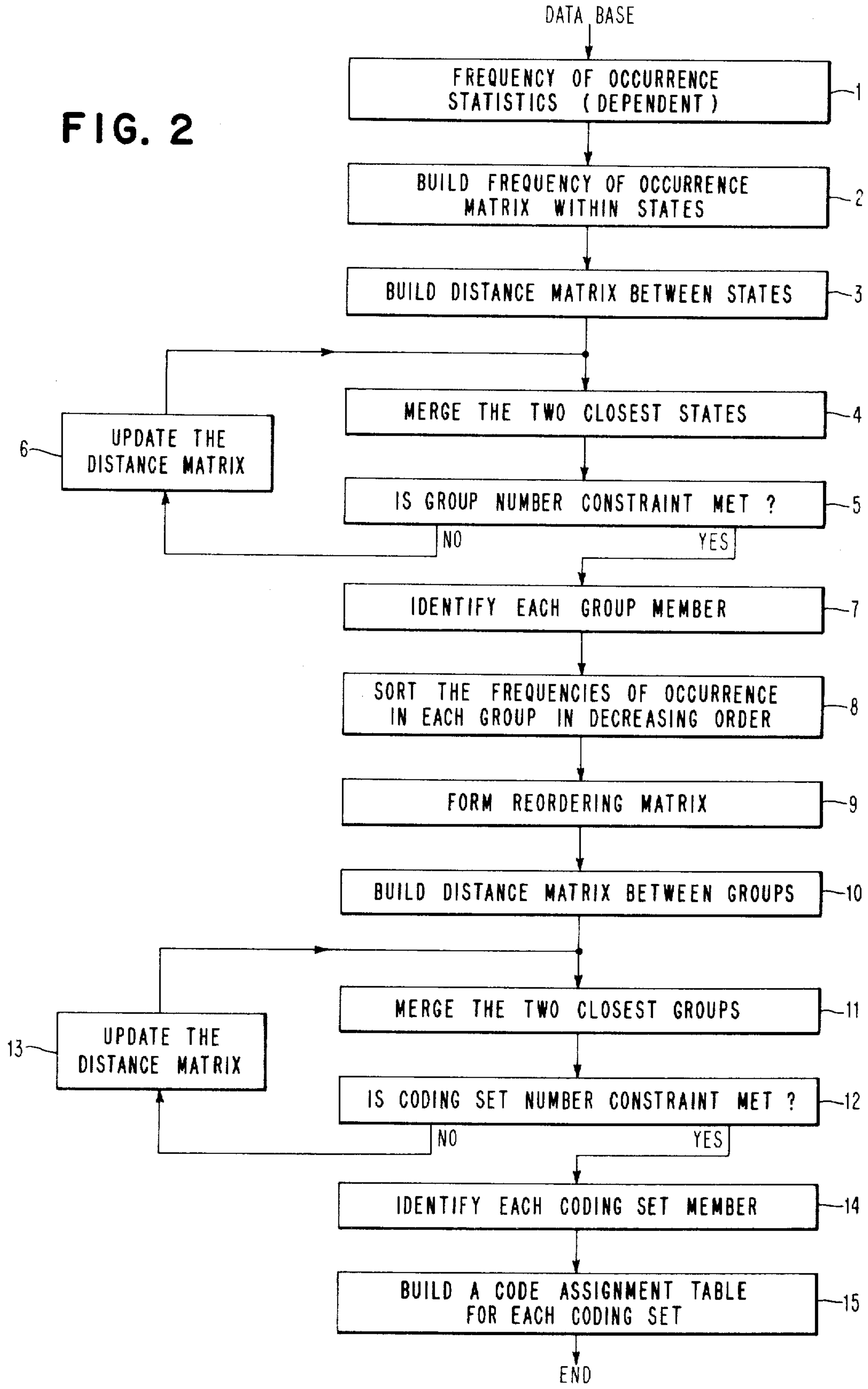
FIG. 2 comprises a medium level flow chart of the present data compaction method.
Figure 3:
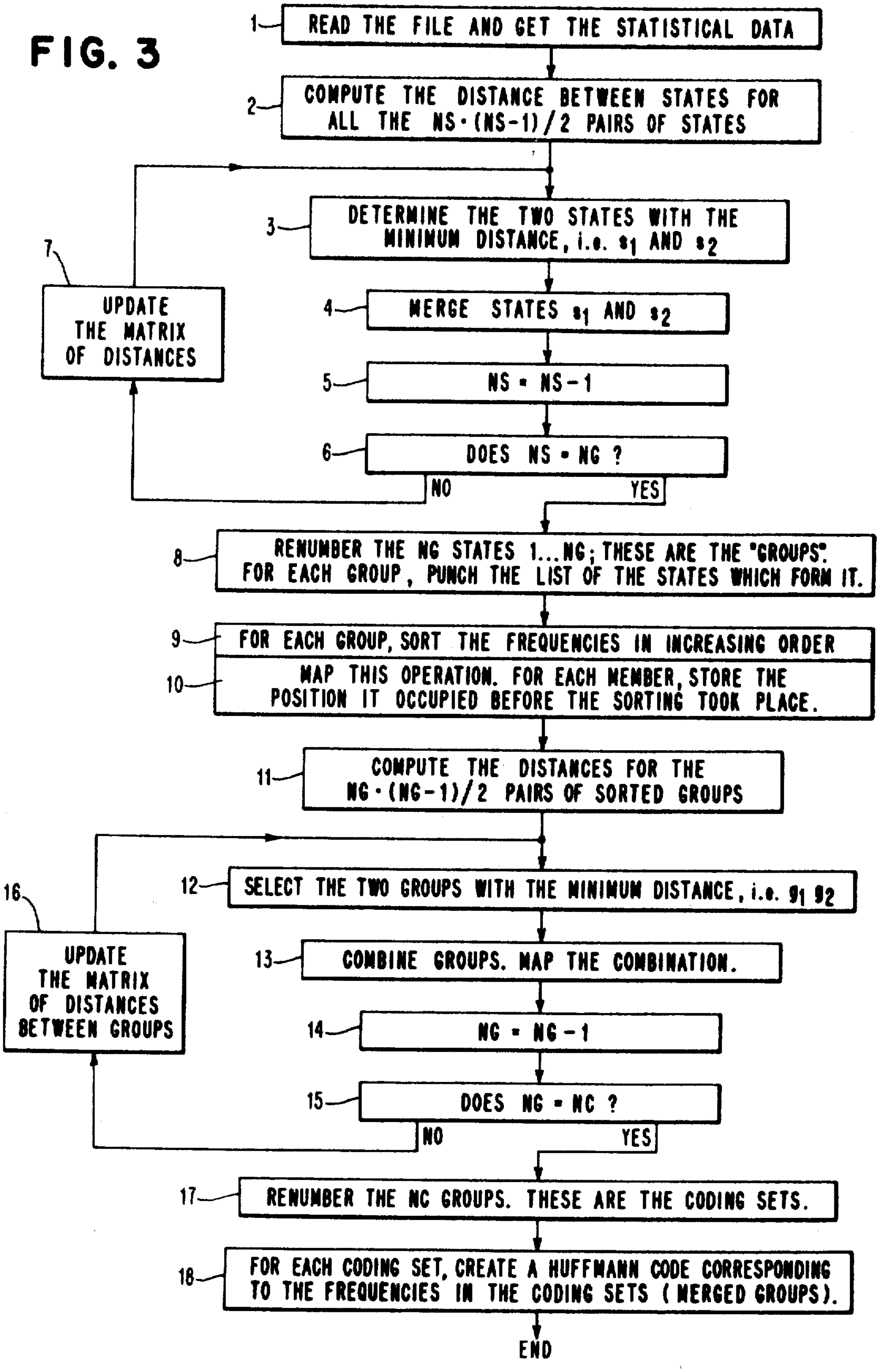
FIG. 3 comprises a more detailed medium level flow chart of the present data compaction method.

FIGS. 1–3 are the general flow charts describing in detail the method of data analysis necessary to produce the final code assignment tables and are quite general to any data base and any character set. FIGS. 4–11 are exemplary of a particular sample of data and a data set wherein only ten characters, i.e., A–J are utilized. Thus the specific example set forth in FIGS. 4–11 is for illustrative purposes only to teach the principles of the invention and certainly is not to be considered as limiting on the overall method.

Referring first to FIG. 1, which is a very high level flow chart, the first block is indicated as Cluster (first Stage). The inputs to this block are indicated as Statistics and Constraints. The Statistics comprise the complete frequency of co-occurrence analysis of a sample of the data base and include all figures for all of the $n+1$ states and all of the $n$ characters in each state. The Constraints refer to the number of groups which the programmer has decided to assign to the process. In the present example which will be set forth subsequently, five groups were designated. This first clustering stage implies that the states will be clustered until only five groups remain and a record is kept of the states which comprise each group.

Block 2 is labelled Re-order. This refers to the operation of re-ordering the characters of each of the groups into an ordered set based on frequency of occurrence. This may be in either ascending or descending order as will be obvious. At this time a mapping table must also be kept to indicate the original position of the characters in the groups before re-ordering.

Block 3 indicated as Cluster (second Stage) refers to the operation of performing clustering on the re-ordered groups. This is continued until the desired number of coding sets as indicated by the constraints are obtained.

Finally, Block 4 labelled Construct Assignment Table infers the application of the statistical data of the coding sets to a code building routine wherein the individual members of the coding sets are assigned variable length code representations based on their frequency of occurrence. In general, the lower the frequency of occurrence, the longer the code and the higher the frequency of occurrence, the shorter the code. The code building is done using the well known Huffman algorithm.

In the above description of FIG. 1, the specific steps of determining the distance matrix prior to and during both clustering operations has not been specifically set forth. Referring now to FIG. 2, which is a more detailed flow chart of the present method and to Block 1, it will be noted that the data base information is fed into this block and the frequency of co-occurrence statistics are developed, That is to say that an actual count may be kept of the total number of times that each character appears after every other character of the character set with an additional statistic being kept when the character comes at the beginning of the record.

The output of Block 1 goes into Block 2 which implies that an actual Frequency of Co-Occurrence Matrix is built in memory wherein the total number of characters ($n$) appears on one side of the matrix and the total number of states ($n$+1) appears on the other side of the matrix (i.e., rows and columns). The completion of Step 2 proceeds to Block 3 wherein a distance matrix is constructed for the matrix of Block 2. In this operation the distance or displacement of all of the $n$+1 states to each of the other states is determined. The specific method by which the present invention has found it convenient to make this determination will be set forth subsequently. However, generally, this determination involves obtaining some measure of the loss in compaction incurred by joining two states under consideration.

Block 4 states that the two closest states as determined from Step 3 should be merged. The criteria for determining closeness is selecting the two states having the lowest or smallest distance between same. In Step 5 a determination is made as to whether the group number constraint applied by the programmer has been met. If not, the process proceeds to Step 6 wherein the distance matrix set forth and described in Step 3 must be updated for the two states that have just been combined. It should be noted that this newly combined state may be different from either of the preceding component states and a new computation will have to be made to determine its distance relative to all of the other remaining states. After this step, the process returns to Block 4 and Block 5. Now, assuming that the group number constraint has been met the process enters Block 7, wherein a group membership table is set up so that it is possible to determine to which group each of the original states has been assigned.

In Block 8 the sorting or re-ordering of the members of the final groups is performed. This is done on a frequency of occurrence basis in either ascending or descending order but it of course must be the same for all groups. Step 9 involves the forming of the mapping table for each group. This is necessary in order to subsequently encode and decode the data base.

Block 10 indicates that a distance matrix must now be built among the re-ordered groups. It should be noted that this matrix will be smaller than the one of Block 3 since there are now fewer groups than there were original states. However, the method of building or determining the distances are the same as described before. It will further be noted that the distances among groups will be smaller after the re-ordering operation than it would have been had we not re-ordered. Let us note that we have obtained this reduction in distance at the expense of having to keep the mapping tables. It was found that this trade-off is very generally favorable as far as total memory requirements are concerned.

Block 11 indicates that the two closest groups as determined by Block 10 should be merged. After the merging operation and the combining of statistics into a single group, Block 12 tests to see whether the required number of coding sets has been formed. Assuming this is not the case, Step 13 indicates that the distance matrix for the groups must be updated in accordance with the last performed merger and the method returns to the Steps 11 and 12. Assuming now that the coding set number constraint has been met, the method continues to Block 14.

In this block the coding set membership table is set up to identify the particular groups which have been clustered into each of the final coding sets.

Block 15 calls for the building of the actual code assignment table from the coding sets and the statistics accompanying same. This is performed by a completely straightforward routine such as the utilization of the Huffman coding techniques as described previously and is done strictly on a frequency of occurrence basis within each coding set and forms no part of the present invention. It is again stated that some other code than the Huffman code can be utilized both in forming the final assignment tables and also in building the distance matrices in Steps 3 and 10.

The final output of this system then comprises the various assignment tables for the coding sets as well as the required mapping and membership tables all of which are needed in the data compaction system such required in the previously referenced co-pending application of the same inventors entitled "Code Processor for Variable Length Dependent Codes."

It should be noted that many different ways could be utilized in building specific encoding and decoding tables insofar as setting up memories, addresses, indices, etc. and essentially form no part of the present process.

Referring now to FIG. 3, which is a still more detailed version of the method of the present invention as set forth in FIG. 2, only those Blocks which are significantly different from FIG. 2 will be specifically explained. It is noted that all of the Blocks of FIG. 3 are numbered sequentially, however, the numbers of FIG. 3 do not necessarily correspond to those of FIG. 2. The relationship of the Blocks of the two FIGS. should be quite apparent from the legends within the Blocks. It should first be noted in Block 2 that the number of distances or displacements between the states are indicated as being equal to the number $$\frac{NS\times(NS-1)}{2}$$

which indicates the number of pairs of states, the distances between which must be computed to form a complete distance matrix. Blocks 5 and 6 merely specify in a program oriented notation that after the merging of two states, the new number of states is diminished by one before the test in Block 6 to see if the remaining number of states is equal to constraint provided, i.e., the final number of groups (NG).

Block 8 specifies in more detailed form the bookkeeping for renumbering the remaining states and also for producing the states to group membership table.

Block 10 refers to the operation of forming the mapping table as the re-ordering of the groups occurs.

Block 11, as with Block 2, specifies the number of computations that are necessary to form the distance matrix for the re-ordered groups. Blocks 14 and 15 specify the constraint testing to see if the required number of coding sets have been formed at the end of Step 13.

The preceding description of FIG. 3 completes the overall description of the present method for analyzing a data base and forming an assignment table for encoding and decoding data in a data compaction system embodying the teachings and principles of the present invention. It is believed that any competent programmer provided with the present flow charts could easily write a program capable of performing the disclosed method. The presently disclosed software concept has been written using Fortran and Assembly language and operating through an IBM Model 360 having 400 K bytes of storage for storing the working matrices and tables.

The following specific example is intended to be illustrative only of the invention, it being apparent that the limited character sets shown, i.e., the letters A through J, would hardly to typical of a normally encountered data base. A byte specifies a sequence of bits, e.g., eight bits.

Referring now specifically to FIGS. 4 through 11, it will be noted that FIG. 4 comprises a Frequency Co-occurrence Matrix for a data set utilized for the purposes of evaluation containing 25 records which in turn contained a total of 1,223 characters. There were 10 byte configurations containing the characters A, B, C, . . . J. In the figure, it will be noted that there are 11 states or columns and 10 rows. State 1 corresponds to a beginning of a record. In the example, it will be noted that there were no instances in which A appeared as the first character and only four in which B and C appeared, etc. States 2 through 11 correspond to states in which the preceding character is A through J. The frequency of co-occurrence statistics represent an actual character count in this case. However, it will be readily understood that the percentage figures could be used as well as counts. This figure represents the actual preparation of a Frequence Co-occurrence Matrix in memory according to the present invention. Stated more precisely, it represents the computations performed by the program which of course, would be stored within the system performing the program and would not normally be printed out unless a specific printout were requested.

Referring now to FIG. 5A, there is shown a Distance Between States Matrix showing the $$55=\left(\frac{11\times10}{2}\right)$$

distances among 11 states. Having computed this matrix, the first clustering operation involves selecting the smallest number which, it will be noted, is the number 15 which has been circled and corresponds to the distance between states 11 and 9. Thus, when the two states 11 and 9 are combined, the number 15 implies that only 15 more total bits would be utilized to code the file (after the combination of these two states), than would be utilized if they were encoded separately. This number is proportional to the compaction loss in merging the two states.

The way in which the computation of distance is performed is shown in FIGS. 5B, 5C, and 5D. This computation assumes states 1 and states 2 are being looked at; 5B shows the computation of the total number of bits to encode state i.e. the characters in the file which are in the beginning of the records; FIG. 5C indicates the computation of the total number of bits to encode state 2; and FIG. 5D indicates the total number of bits required to encode all of the characters in the file which follow either state 1 or 2; i.e. combine states 1 and 2.

Referring now specifically to FIG. 5B, in the lefthand column, the original contents of the state 1 column are shown. This implies as indicated previously the occurrence of various characters A through J appearing as the first character in a record. The middle column indicates the number of bits in a Huffman code necessary to encode each character implied by the lefthand column. This determination of code bits is done in a straight-forward manner using Huffman coding techniques. Thus, for example, the letter B which occurs four times in state 1 would require four bits of a Huffman variable length code for encoding. Similarly, the letter D which occurs 10 times and is thus the most frequently occurring bit could be represented by only one bit. The right hand column of the figure indicates the total number of bits required for encoding each character in the file which is in state 1. Thus, the letter B requires four bits; there are four B characters in state 1 or 16 total bits. The letter C occurs four times and would have a code length of three bits thus requiring twelve total bits, etc. The total number of bits required to encode all the characters in the file which are in state 1 is thus 54 bits.

The computation of code requirements for state 2 shown in FIG. 5C is exactly the same as for state 1 with the exception that the Huffman coding, as is apparent, is quite different with the different frequency of occurrence statistics. Thus, the letter F which occurs 20 times and the letter C which occurs 24 times, and are thus the most frequently occurring bits in this state each require a tow bit code for their representation. Similarly, a code length is determined for all of the other characters in state 2 again utilizing standard Huffman coding procedures with the result that a total of 325 bits would be required to completely encode all characters in state 2, (i.e., all characters in the file following an A).

FIG. 5D shows the results of combining states 1 and 2. For this computation the left hand columns of FIG. 5B and 5C, which are the original states are merely added together indicating all of the characters counts, thus for A there is a total of seven, for the letter B a total of 17, for the letter C a total of 28, etc. Next a determination is made of the code requirements for this particular distribution of characters with the resultant code length representation shown in the central column of FIG. 5D. Thus, for the two most frequently occurring characters the letters C and F two code bits are required, while for the characters A, H, I, and J five bit code representations are required. Multiplying these two columns, the right hand column is obtained showing the total number of bits required to encode states 1 and 2 in combination wherein it will be noted that a total of 400 bits is required. Subtracting the figure 379 from 400 produces the distance of 21 bits which, it will be noted, is entered in column 1 row 2 of the Distance Matrix of FIG. 5A. The necessary figures for the Matrix of FIG. 5A are produced by the program and as indicated previously, the smallest distance is selected and these two states combined. The combined figures shown in FIG. 5D for the two selected states must then replace two of the original state columns of FIG. 4 and a new Distance Matrix computed. The result of such a computation is shown in FIG. 5E. The only entries in this matrix which need to be recomputed are the distances of all other states to the new state.

This process is continued iteratively until the states are successively combined so that the total number of remaining states reaches the number NG (number of groups), which is one of the constraints provided by the programmer to the program. It will be noted at this time that, after the clustering operation, the states are referred to as groups.

FIG. 6A indicates the results in the present example after the clustering of all states down to the level where five groups remain. This is shown clearly wherein the five columns represent the five groups and the ten rows represent the respective character to which the frequency of occurrence numbers within the matrix correspond. As will all of these figures, the actual graphical or matrix representation of these figures is for purposes of illustration. In the actual program, obviously, the figures would be kept in the machine memory in an appropriately accessible spot wherein various rows and columns may be accessed as required by the program.

FIG. 6B illustrates the Group Membership Table wherein the state numbers and the previous characters which they indicate are shown in the upper two rows and the final group into which these states have been clustered is shown in the bottom row. This membership table would be utilized together with the final assignment table in the coding process.

The next operation namely the reordering of the members of the group, is shown in FIG. 7, the Reordered Group Matrix. This illustrates the reordering of each of the five groups shown in FIG. 6A. It will be noticed that in this case, the reordering is done so that the frequencies are ordered according to size. Referring to group 1 in column 1 of FIG. 7, it will be noted that the number 13, which referred to the character H in group 1, FIG. 6A, is now the first figure in the column. Thus, it is necessary to keep track of all of this reordering information. The way this is done is shown in FIGS. 8 and 9, the Mapping Tables for Encoding and for Decoding, respectively. Thus, in FIG. 9, the letter H appears in column 1, row 1 indicating that the number 13 was originally representative of the occurrence of the character H in group 1. FIG. 9 thus represents a mapping of all of the reordering shown in FIG. 7.

In both FIGS. 8 and 9, the upper case letters correspond to characters in the input to be coded and characters in the output, i.e., decoded. The lower case letters correspond to intermediate characters generated by the process of coding and decoding. Thus, referring to FIG. 8, if it is desired to code the letter G in group 3, follow the row marked G over to column 3 where it is noted that there is a lower case *i*. This indicates that the code representation for a lower case *i* in the proper coding set will be chosen to represent the original code character capital G. If the G had been in a different group, due to the character immediately preceding it, this mapping table would similarly have given the proper coding set character to be used to represent same in the variable length compaction code.

The same designation applies into FIG. 9. In this figure, the vertical columns correspond to the groups and the upper case letters indicate the actual fixed length character which should be decoded. The lower case characters are intermediate decoded characters. Thus for example, if the variable lengths character received, is decoded as a lower case *h* and the preceding character had decoded as an E, it would be known that this *h* was in state 6 and group 3 and looking down column 3 of FIG. 9 and across row *h*, this encoded character would be decoded as a C.

Referring again to the figures, FIG. 10 represents the Distance Matrix for the Reordered Group Matrix of FIG. 7. Referring now to FIG. 10 the numbers therein signifying group distances are considerably smaller than the distances of the original states. In particular, the displacement between states 1 and 4 is 0, thus, these two states will be the first ones merged (without any loss in compaction) and a new distance matrix for the reordered groups is constructed iteratively until there are only two remaining groups with their appropriate statistics. These final groups are referred to as the coding sets. These are shown in FIG. 11A. More specifically, the middle column of the portions of the figure contains the actual coding set statistics. The lower case letters a through *j* in both instances actually are addresses to the coding set tables. As to whether the character would be encoded according to coding set 1 or coding set 2 would of course depend upon the particular state to which it belonged. It should be noted that the assignment tables of FIG. 11A, the Group Coding Set Membership Table of FIG. 11B, Group Membership Table of FIG. 6B and the Mapping Tables for Encoding/Decoding of FIGS. 8 and 9, respectively, are all automatically generated and stored in the system and can be used for generating conventional encoding and decoding tables such as those described in the previously referenced co-pending application of the present inventors.

As a final example we show the way in which the assignment tables and mapping tables would be utilized to encode the three characters DIG. First, the character D is considered, which is the first character in a record. Thus, we have group 1 as an initial value and coding set 1. Referring now to FIG. 8, the character D in group 1 gives address (character) *h* in coding set 1. Referring now to FIG. 11A, it will be noted that the proper code designation for the address (intermediate character) *h* is 100.

The second character I is preceded by a D which is state 5, and in group 1 and coding set 1. Referring again to the mapping table, FIG. 8, the character I in group 1 is to be encoded as an *e* in coding set 1 which has the binary designation 1100. Finally the letter G is preceded by the letter I which is state 10 and in group 2 which in turn is a member of coding set 2. Referring again to the mapping table a G in group 2 must be encoded as a*h* in coding set 2. The binary code for this word has been designated as a 100.

It is of course obvious that decoding would proceed in the same way, in that the identification of a preceding character automatically indicates the state, group, and finally the coding set for the next subsequent character. However as stated previously, the particular way in which the mapping tables, assignment tables etc. are utilized to form efficient encoding and decoding tables for a data compaction facility does not form a part of the present invention. The mapping tables and assignment tables could be utilized in a number of different ways to act as pointers, index registers, etc. to provide an optimal package on a particular hardware or software organization.

In the preceding description of disclosed method of generating a compaction code, the expression that a character is in a particular state means that it is preceded by some other particular character. Also, for clarification of terminology during the first clustering operation or stage, the merged states may be referred to as states or groups, however, the term group is applied to all of the final merged states subsequent to the final iteration of the first clustering stage. It should be understood that it is quite possible that one or more of the final groups will consist of only one state.

The present data compaction system has been successfully used to analyze a number of different data bases and to generate the required statistics and membership mapping and assignment tables. In certain instances, compaction rates of 3 to 1 or more have been obtained, that is where the compacted data took only one-third as much storage space as the raw data.

The method of generating data compaction assignment tables disclosed herein, can be written in a wide variety of machine languages for most any standard general purpose computer having storage and I/O facilities.

CONCLUSIONS

Utilizing the teachings of the present invention, a skilled programmer could readily prepare an assignment table generating program. A sample data base together with the group and code set constraints would be entered into the machine together with the program and all of the assignment membership and mapping tables may be automatically generated without programmer intervention. As will be readily appreciated, these assignment and mapping tables may be utilized by subsequent separate programs to provide efficient encoding and decoding tables for performing the actual work of encoding and decoding the data.

Although a significant amount of machine time is required for the generation of these tables, it should be noted that for a given data base, once the assignment and mapping tables have been generated and the encoding and decoding tables produced therefrom, these tables may be utilized hence forward without change unless significant characteristics of the data base or character set occur.

While the invention has been particularly shown and described with reference to a preferred embodiment thereof, it will be understood by those skilled in the art that various changes in form and details may be made therein without departing from the spirit and scope of the invention.

What is claimed is:

1. A method for generating the assignment, membership and mapping tables for a data compaction code on a general purpose electronic computer for an N character data base comprising the steps of:

constructing in memory from a predetermined data base sample a matrix of the dependent frequency of occurrence statistics for all of the characters of the data base together with an additional state for those characters at the beginning of a record to produce N+1 original states in said matrix, examining said matrix and successively clustering into groups, pairs of states having the most similar frequency of occurrence statistics until a predetermined number of groups remains, retaining in memory a membership table indicating in which group each of said original states belongs, utilizing these groups as coding sets and assigning distinctive variable-length prefix-free codes to each of the members of said coding sets, said assignment tables and membership tables comprising the necessary data to form encoding and decoding tables for said data base.

2. A method for generating a data compaction code as set forth in claim 1, including the steps of re-ordering the statistics for each of the members of said predetermined groups in an order in magnitude progressively varying, retaining an indication in memory of the original position each of the members of each said re-ordered group occupied prior to said re-ordering, and performing a second clustering operation wherein those pairs of re-ordered groups having the most similar frequency of occurrence statistics are combined until a predetermined number of said reordered groups are obtained and retaining in memory a membership table indicating to which combined groups the original re-ordered groups belonged.

3. A method for generating a data compaction code as set forth in claim 2, wherein said clustering step includes successively determining those pairs of re-ordered groups which have the most similar frequency of occurrence statistics and combining said pairs of groups until a pre-determined number of said re-ordered groups is obtained, and utilizing said predetermined number of re-ordered groups as the coding sets for assigning variable-length prefix-free data compaction codes to the members thereof.

4. A method for generating a data compaction code as set forth in claim 1, wherein the method of determining which pairs of states have the most similar dependent frequency of occurrence statistics includes selectively determining those pairs of states which have minimum distance relative to each other, said distance being a measure of the difference in storage requirements for all characters of the data base in any two states before combination and after combination, combining the frequency of occurrence statistics of a pair of states which it has been decided are to be combined and utilizing the combined frequency of occurrence statistics in determining which subsequent pairs of states are to be combined upon iteration of the clustering step.

5. A method for generating a data compaction code as set forth in claim 2, wherein the method of determining which pairs of re-ordered groups have the most similar frequency of dependent occurrence statistics includes successively determining those pairs of re-ordered groups which have minimum distance relative to each other, said distance being a measure of the difference in storage requirements for all characters of the data base in any two groups before combination and after combination, combining the frequency of dependent occurrence statistics of a pair of re-ordered groups which it has been decided are to be combined and utilizing a combined frequency of occurrence statistics in determining which subsequent pairs of re-ordered groups are to be combined upon iteration of the second clustering step.

6. A method for generating a data compaction code as set forth in claim 5 wherein both clustering operations include the building in memory of a distance matrix for all of the pairs of states and re-ordered groups and, selectively interrogating said distance matrix before the first and before any subsequent combinations of groups to select the pair having the smallest distance figure.

7. A method of forming a data compaction code as set forth in claim 6, wherein the distance matrix is formed by successively determining the distance of all $$\frac{NG\times(NG-1)}{2}$$

pairs of the states and groups currently in the dependent frequency of occurrence matrix being clustered wherein N = number of characters in the data base and G = current number of groups in the frequency of co-occurrence and wherein the figure is diminished by one every time a pair of states is combined and the distance matrix is re-computed.

8. A method of generating a data compaction code as set forth in claim 7, wherein the step of determining the distance between any two groups or states of the frequency occurrence matrix comprises the steps of assigning a dependent frequency of occurrence based variable-length prefix-free compaction code to each member of the group, multiplying the code length of the assigned code for a given member times the number of occurrences of the member to obtain the total number of bits required to store said member, adding the results of this multiplication for all the members of the state or group, giving a total figure $P_{i_1}$ performing the same operation for another state or group whose distance from the first state or group is to be determined and giving this total designation $P_{i_2}$, combining the frequency of occurrence statistics for both groups by addition, determining the code length for each member of the combined group, multiplying this code length times the total number of occurrences for each member of the combined group, adding the results together for all of the members of the combined group and assigning a value $P_{i_{1+2}}$ and wherein the distance between the two groups is determined by the use of the following formula:

$$\text{Distance} = P_{i_{1+2}} - (P_{i_1} + P_{i_2})$$

9. A method for generating a data compaction code as set forth in claim 8 including the step of evaluating the dependent frequency of occurrence statistics for each coding set and assigning a variable length, prefix free Huffman code to each of the members of each coding set.

10. A method for generating a variable-length prefix-free data compaction code for an N character data base on a general purpose electronic computer including I/O equipment, memory, instruction unit, and a processing unit, said method comprising the steps of forming in memory from a typical example of said data base a complete dependent frequency of co-occurrence matrix for all the possible N + 1 states, wherein each state has N members, selectively accessing selected states of said dependent frequency of occurrence matrix and clustering most similar states and groups until a desired number of groups is obtained and concurrently retaining a group membership table as said clustering operation proceeds, re-ordering all the members of said desired number of groups in progressively varying size of its occurrence statistics, concurrently maintaining a mapping table indicating the position each member of said re-ordered group occupied prior to said re-ordering, performing a second clustering operation including combining those pairs of re-ordered groups together which are most similar statistically, continuing said clustering until a desired number of re-ordered groups are present and concurrently maintaining a coding set membership table, indicating to which coding set each re-ordered group belongs, utilizing the final desired number of clustered reordered groups as coding sets and creating an assignment table wherein each member of each coding set is assigned a specific variable-length, prefix-free code designation for subsequent incorporation into direct encoding and decoding tables for said data base.

11. A method for generating a data compaction code as set forth in claim 10 wherein said clustering step includes the steps of determining a measurement of the additional storage requirements for each possible pair of states or groups of the frequency of co-occurrence matrix before and after combining same respectively.

12. A method for generating a data compaction code as set forth in claim 11 wherein the figure representative of storage requirements for two states prior to and after clustering comprises the assigning of a variable-length compaction code to each of the states being considered and determining the number of bits of the compaction code for each member of each state, multiplying the frequency of occurrence number times the code length number for each member of each state and adding the results together to provide a figure representative of the total storage requirements for storing all of the characters of the sample data base belonging to said two states when added separately and subsequently combining the two states whereby the frequency of occurrence statistics for each member and added together to provide a combined frequency of occurrence statistic for each member and assigning a variable-length prefix-free code to each member of said combined state and applying the code length times the combined frequency of occurrence number for each member and adding these results together to provide an indication of the total storage requirements for the members of the sample data base in said combined group and taking the difference between the combined storage requirements and the total of the storage requirements wherein the distance or similarity between the groups is inversely proportional to this latter figure.

13. A method of generating a data compaction code as set forth in claim 12 wherein a distance matrix is constructed in memory for all of the possible currently existing groups undergoing clustering and each subsequent clustering step is chosen on the basis of the smallest distance figure existing in the matrix, and subsequently recomputing the distance matrix for all members affected by the two newly combined groups.

14. A method for generating a data compaction code as set forth in claim 13 including the step of evaluating the dependent frequency of occurrence statistics for each coding set and assigning a variable-length, prefix-free Huffman code to each of the members of each coding set.

15. A method of generating a variable-length data compaction code for an N character data base on a general purpose electronic computer including I/O devices, memory, and instruction and processing units comprising the steps of forming in memory a complete dependent frequency of occurrence matrix of a predetermined sample of the data base for all the possible N+1 states wherein each state has N members, constructing a distance matrix from said frequency of dependent occurrence matrix for all the possible pairs of the states in said frequency of dependent occurrence matrix, selecting the row and column of that member of said distance matrix having the smallest distance figure, combining together the two states corresponding to the aforesaid row and column, recomputing the distance matrix using the combined state, again selecting a new row and column for that member of said distance matrix having the smallest distance figure, continuing said combination of states recomputing the distance matrix and selecting the smallest distance number until a predetermined number of groups formed by said combined states is produced, re-ordering numbers of said predetermined number of groups in an order of progressively varying size of the frequency of occurrence number for the members thereof, retaining a mapping table in memory indicating the original position of each member of said re-ordered group prior to the re-ordering and also retaining in memory a group membership table indicating the original states that have been clustered into each of the predetermined number of groups, forming a second distance matrix in memory for said re-ordered groups and selecting the row and column of that number of said distance matrix having the smallest magnitude and combining together the two re-ordered groups corresponding to the aforesaid row and column, recomputing the distance matrix subsequent to the combination of said two re-ordered groups, and continuing said selection grouping and recomputation steps until a predetermined number of re-ordered groups has been retained, retaining a coding set membership table indicating the re-ordered groups in each coding set and utilizing the final predetermined number of combined re-ordered groups as coding sets and assigning variable length prefix free Huffman compaction codes to each number of each coding set, thus forming an assignment table for the compaction of said data base.

* * * * *